(12) United States Patent
Schulze

(10) Patent No.: US 10,144,114 B2
(45) Date of Patent: Dec. 4, 2018

(54) TOOL FOR MACHINING MATERIAL AND METHOD OF PRODUCING SAME

(71) Applicant: Dr. Müller Diamantmetall AG, Weilheim (DE)

(72) Inventor: Michael Schulze, Feldafing (DE)

(73) Assignee: VK INVESTMENT GMBH, Tutzing (DE)

( * ) Notice: Subject to any disclaimer, the term of this patent is extended or adjusted under 35 U.S.C. 154(b) by 0 days.

(21) Appl. No.: 15/485,041

(22) Filed: Apr. 11, 2017

(65) Prior Publication Data

US 2017/0216995 A1 Aug. 3, 2017

Related U.S. Application Data

(63) Continuation of application No. 14/882,856, filed on Oct. 14, 2015, now Pat. No. 9,776,304.

(30) Foreign Application Priority Data

Oct. 15, 2014 (EP) .................................. 141891028

(51) Int. Cl.
*B24D 5/04* (2006.01)
*B24D 3/10* (2006.01)
(Continued)

(52) U.S. Cl.
CPC ................ *B24D 5/04* (2013.01); *B24D 3/06* (2013.01); *B24D 3/10* (2013.01); *B24D 5/02* (2013.01);
(Continued)

(58) Field of Classification Search
CPC . B24D 5/04; B24D 3/06; B24D 18/00; B33Y 10/00
(Continued)

(56) References Cited

U.S. PATENT DOCUMENTS 1,977,952 A * 10/1934 Offenbacher ............ B24D 5/12
451/541
4,718,398 A * 1/1988 Hallez .................. B23D 61/026
125/15
(Continued)

FOREIGN PATENT DOCUMENTS

CN 102649263 8/2012
DE 6939594 5/1970
(Continued)

OTHER PUBLICATIONS

U.S. Appl. No. 14/882,856, "Non-Final Office Action," dated Jan. 10, 2017, 7 pages.
(Continued)

*Primary Examiner* — Robert Rose
(74) *Attorney, Agent, or Firm* — Kilpatrick Townsend & Stockton LLP

(57) ABSTRACT

The invention concerns a tool for machining of materials, specifically a grinding tool, which has a substantially rotationally symmetrical shape with respect to a rotation axis (R), the tool comprising an outer shell centered about the rotation axis and defining an internal space therein, wherein at least a part of a surface of the outer shell is provided with an abrasive coating or component, wherein the outer shell encases an internal skeleton structure in the internal space, the internal skeleton being integral with the outer shell and defining void volumes in the internal space thereby establishing material and void volumes of the internal space, and wherein the material to void ratio M/V is distributed substantially identically along each radius (r) centered around the rotation axis (R) and its corresponding symmetrical radius (r'). The invention also concerns a method for producing such tool.

13 Claims, 3 Drawing Sheets

(51) Int. Cl.
   *B24D 5/02*   (2006.01)
   *B24D 7/18*   (2006.01)
   *B24D 18/00*  (2006.01)
   *B33Y 10/00*  (2015.01)
   *B33Y 80/00*  (2015.01)
   *B24D 3/06*   (2006.01)

(52) U.S. Cl.
   CPC .............. *B24D 7/18* (2013.01); *B24D 18/00* (2013.01); *B33Y 10/00* (2014.12); *B33Y 80/00* (2014.12)

(58) Field of Classification Search
   USPC .............. 451/548, 541, 546; 125/15; 51/293
   See application file for complete search history.

(56) References Cited

U.S. PATENT DOCUMENTS 6,241,522 B1 * 6/2001 Schon ...................... A61C 3/06
                                                     433/166
2015/0290878 A1 * 10/2015 Houben .............. B29C 67/0059
                                                     419/1
2016/0107294 A1    4/2016 Schulze

FOREIGN PATENT DOCUMENTS

| | | |
|---|---|---|
| DE | 2448093 | 4/1976 |
| DE | 4300417 | 8/1994 |
| DE | 102005034258 | 1/2007 |
| DE | 102011009364 | 8/2012 |
| EP | 2641696 | 9/2013 |
| GB | 1374513 | 11/1974 |
| WO | 2013030064 | 3/2013 |

OTHER PUBLICATIONS

U.S. Appl. No. 14/882,856, "Notice of Allowance," dated May 30, 2017, 5 pages.

EP14189102.8, "Extended European Search Report," dated Apr. 13, 2015, 7 pages.

* cited by examiner

TOOL FOR MACHINING MATERIAL AND METHOD OF PRODUCING SAME

CROSS-REFERENCES TO RELATED APPLICATIONS

This application is a continuation of U.S. application Ser. No. 14/882,856, filed Oct. 14, 2015, which application claims the benefit of EP Application No. 14 189 102.8, filed Oct. 15, 2014, which the entire contents of each which are hereby incorporated by reference in their entirety.

TECHNICAL FIELD

The present invention relates to a tool for machining material, particularly a diamond grinding wheel, and a production method for producing such a tool.

DESCRIPTION OF PRIOR ART

Machining tools are known in the art and used for shaping or machining metal and other rigid materials. Typical operations performed by a machining tool are milling, boring, grinding, shearing and the like. In order for a machining tool to perform these operations on the material, generally rigid material, the tool must have sufficient stability to withstand the forces and the heat generated during the machining operation. Generally, such tools are rotated at high rotational speeds and at the same time moved along a defined path along the rigid material to remove material therefrom.

Conventional tools have some disadvantages for a variety of reasons. For machining tools, and particularly grinding tools, the carrier bodies of the tool are of considerable size and have considerable thickness. Generally, this makes them heavy and difficult to handle and, given the high rotational speeds during use, may also cause strong vibrations that are difficult to predict as well as control. The vibrations are extremely damaging to the bearings, which constrain the movement of the tool and reduce friction of the moving parts.

To deal with the vibrations, vibration-damping means for suppressing the vibrations during operation of the tool can be provided. Such means, however, cannot do away with the significant difficulties that may be required when rigging machines with conventional tools of significant size due to their weight.

Lighter machining tools have been developed using body carriers made of light metal, such as, carbon fibre composites. While a tool made from carbon fibre would solve the heaviness problem of prior art machining tools, they have their own drawbacks in that usage of these materials is very expensive and the tools are significantly more difficult and costly to produce. Additionally, carbon fibre tools, due to the rigidity of the carbon material, exhibit vibrations caused by the grinding process and which develops due to a missing radial elasticity of the carbon tool.

Accordingly, the object of the present invention is to solve or at least reduce these problems of the prior art, and, in particular, provide a light machining tool that is also easy to handle and minimizes vibrations during use. A further object is to provide for a method of producing such improved tools.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

These objects are at least partially solved by the tool of the present invention for machining materials, such as a diamond grinding tool, according to independent claim 1, and a method of producing the same according to independent claim 11. Implementing embodiments of the invention are subject matter of the respective dependent claims. The tool of the invention has a substantially rotationally symmetrical shape with respect to a rotation axis. It comprises an outer shell centred about the rotation axis and defining an internal space therein, wherein at least a part of a surface of the outer shell is provided with an abrasive coating or component.

The tool of the present invention is characterized in that the outer shell encases an internal skeleton structure in the internal space, the internal skeleton being integral with the outer shell and defining void volumes in the internal space. The skeleton structure thus helps to establish a material and void volumes throughout the internal space wherein the material to void ratio is distributed substantially identically along a radius centred around the rotation axis and its corresponding symmetrical radius.

With such a configuration, the machining tool is lighter than a corresponding tool in which little to no void spaces are provided inside the shell of the tool. This leads to the machining tool being easier to handle. A lighter machining tool means that a less complex system having less requirements can be used in comparison with one handling a heavier machining tool (e.g., strength and support required to operate the tool). There is thus a smaller burden on the system and the corresponding components to be able to handle the tool according to the present invention.

Additionally, because there exists an internal skeleton structure inside the tool, the tool still possesses strong rigidity while having flexibility to absorb or dampen vibrations during operation of the tool, depending on the specific form of the internal skeleton structure. This greatly diminishes the force and amount of vibrations of the tool during operation. This construction of the invention also allows the use of conventional materials, and does not rely on expensive options such as carbon fibre, reducing the cost and complexity required for producing the tool.

Within the context of the present invention, the outer shell being integral with the internal skeleton structure inside the shell is meant to say that they are preferably formed as a single unit. This is accomplished via the production method of the present invention as will be explained in more detail below. An integral structure within the meaning of the invention simplifies the production process, particularly requiring less material, and the tool is thus less expensive to produce.

Within the context of the present invention, the term void or void spaces is to be understood as a volume of empty space or a volume of material which is less dense than the material of the skeleton structure within the internal compartment of the shell, i.e., absence of the material that makes up the internal structure. For example, the internal structure may define a plurality of bodies of air throughout the material and/or an interconnected network of open spaces. The specific arrangement of the voids throughout the internal space is dependent upon the arrangement of the internal skeleton structure, i.e., the pattern of the material forming the skeleton structure defines the void volumes.

The material to void ratio gives an indication of how dense the internal space of the tool is. The higher the ratio, the less void space inside the tool while a low ratio indicates more void space and, as a consequence, a lighter machining tool.

In the present invention, the distribution of this ratio is such that for any radius of the tool, walking along a radius extending from the centre, i.e., the point where the rotational axis sits, the ratio will be identical with a ratio at the corresponding position along a symmetrical radius with respect to the rotation axis. The radius can be also any portion or area definable by a set of radii, with the symmetrical radius being a portion or area of the same size on the opposite side of the rotation axis.

While the distribution along the entire radius is substantially identical to distribution along the respective symmetrical radius, each microscopic point of the symmetrical radii do not have to be identical so long as the more macroscopic distribution is. This requirement ensures that the cylindrical tool is balanced during operation to prevent unstable rotation and development of vibrations during use of the tool.

In an embodiment of the invention, the internal skeleton structure is made of the same material as the outer shell. This allows for easy manufacturing and less complexity due to the uniform composition of the tool.

In an embodiment, the overall material to void ratio of the internal space occupied by the internal skeleton structure and the void volumes may be ≤0.7, ≤0.6, ≤0.5, ≤0.4, or ≤0.3. In these embodiments, a tool with more void space than skeleton structure is provided as observed from these ratios below 1, as decreasing the weight as desirable.

In a further embodiment of the present invention, the material to void ratio has local deviations or the local material to void ratio deviates substantially from the overall material to void ratio. Certain portions of the tool, and more specifically the internal skeleton structure, may be fully filled with material (i.e., solid) while other portions may have no material at all (i.e., empty space). These portions would deviate greatly from the overall ratio generally between 1 and 0, representing these extreme densities.

Likewise, for example, an embodiment of the present invention could have an internal skeleton structure where the portions closer to the rotation axis have an elevated material to void ratio, and the portions further away from the rotational axis have a reduced material to void ratio. This would allow certain stability and weight requirements to be met. For other applications, the opposite case is also possible.

So, while for example, the skeleton structure may have a sort of sprocket wheel structure imposed thereon, where the material to void ration is 1, the overall material to void ratio might be less than that. This would indicate that, in an embodiment of such a tool taking the form of a sprocket wheel, what would normally be empty portions in a sprocket wheel would be filled by the skeleton structure, the sprockets still being made of solid material.

In the described case, the internal skeleton structure may be considered as including a supporting frame structure, e.g., the sprockets. This would be considered an implementation of the embodiment above regarding the tool having portions deviating from the overall material to void ratio, as supporting frame structures typically have such a property where the critical support portions are solid and remaining portions essentially void.

In another embodiment, the voids are filled by a filler material other than the material of the skeleton structure and the outer shell, and, optionally, wherein the filler material is of lower specific weight than material of the skeleton structure and the outer shell. It is an objective of the invention to provide a lighter machining tool in comparison with conventional counterparts. In this regard, the void can be simply air or another filler material which is light, particularly material lighter than the material of the skeleton structure that maintains the desired structural requirements of the tool. The filler material may be selected such that it adds to the stability and/or flexibility of the tool but yet lighter in weight. For example, hard plastics and light metals may be employed.

The construction of the internal skeleton structure may take a variety of forms including a three dimensional grid having straight walls, a three dimensional grid having curved walls, a three dimensional scaffold having straight beams, a three dimensional scaffold having curved beams, a honeycomb structure, an irregular structure, a sponge structure and combinations thereof.

The aforementioned examples are ideal structures providing strong support for the tool while requiring less material to construct. These structures allow large amounts of void volume in comparison with the amount of material needed to create the structures. It also follows the void volume can take a number of shapes, as defined by the space in between adjacent components of the structure. Each of these examples show how void spaces can be incorporated into the internal structure of the tool, while maintaining structural integrity and strength to support of the tool.

More specifically, the specific form of the skeleton structure has an impact on the internal stability in the three dimensions and also the vibrational characteristics of the tool. The specific skeleton structure to be used is dependent on the required use and mechanical parameters to be achieved.

For example, a three-dimensional grid structure provides a rigid and stable configuration in which all elements contribute equally to the load carrying capacity and the load distribution is thus quite even. A relatively uniform vibrational characteristic would be produced. A honeycomb structure is also well known to be one of the strongest structures, providing high compression and shear properties while being light weight and having minimal density, however, only in two dimensions. Therefore, in such case, the tool would exhibit strong compression resistance in 2 dimensions, however, in a third dimension its properties may be substantially different. Conversely, if the tool is designed to absorb load at specific portions, rather than evenly throughout, an irregular structure may be more beneficial to provide increased support at such portions.

In another embodiment, the diameter of the shape of the tool varies along a direction of the rotation axis. As such, the tool may have a cylindrical or also a frustoconical shape in which the base end is larger than the end which will contact the material to be machined, or vice versa. The tool can also have multiple levels of differing thicknesses, in a gradual or step-wise fashion along the rotation axis.

The tool of the present invention may be made from a stable material. Materials forming the outer shell and the skeleton structure may be metal, iron, steel, stainless steel, nickel, aluminium, wolfram, molybdenum, bronze, brass or the like. Stable materials are typically more steady during machining conditions and the properties don't change much during use. However, as they are quite hard, they tend to break before flexing. Unstable materials are softer and therefore will flex without breaking. The present invention allows such a range of materials to be used, since the vibration dampening aspect of the tool no longer lies in the material used, but rather the internal structure of the tool. This provides greater flexibility in the production of the machining tool.

This application is also directed to a method for manufacturing the tool of the present invention. Specifically, according to the invention, the tool is manufactured in a bottom-up manner in a layer-by-layer manufacturing process. A bottom-up manufacturing process within the context of the invention means creating an object from scratch by building up material in a desired shape. This is in contrast to a top-down manufacturing process, in which one starts with a larger piece of material and then material is shaped or cut down to form the desired object.

One embodiment of the method of the invention includes the acts of (a) melting the material forming the outer shell and the internal skeleton structure by an applicator, (b) moving the applicator to a first end face of a spatially narrow deposit of the material, (c) applying small amounts of the molten material to the end face of a spatially narrow deposit of the identical material using the applicator, (d) moving the applicator to a second end face of a spatially narrow deposit of the material, and (e) repeating the acts of (c) and (d).

An alternative method for manufacturing the machining tool includes the acts of (a) applying a shapeless and uncured substrate, in particular a powder or a liquid, to a first end face of a spatially narrow deposit of cured substrate, (b) irradiating the shapeless and uncured substrate at a point in close proximity of the first end face using a spatially resolved light source, such as, a laser to melt, sinter or cure the shapeless and uncured substrate so as to form a spatially narrow deposit of the substrate integral with the first end face, and (c) repeating acts (a) and (b).

The aforementioned methods are used for their ability to create the complex patterns required by the internal skeleton structure of the machining tool at the same time as creating the outer shell integrally with the skeleton structure. This way, a tool with the desired outer shape can be produced having an internal skeleton structure in a single production unit rather than undergoing a complex series of production acts where the internal structure is formed in a first act and, only after that, a separate outer shell being applied to the surface of the structure.

Exemplary embodiments of the present invention will hereafter be described with reference to the accompanying drawings.

DETAILED DESCRIPTION

Figure 1:
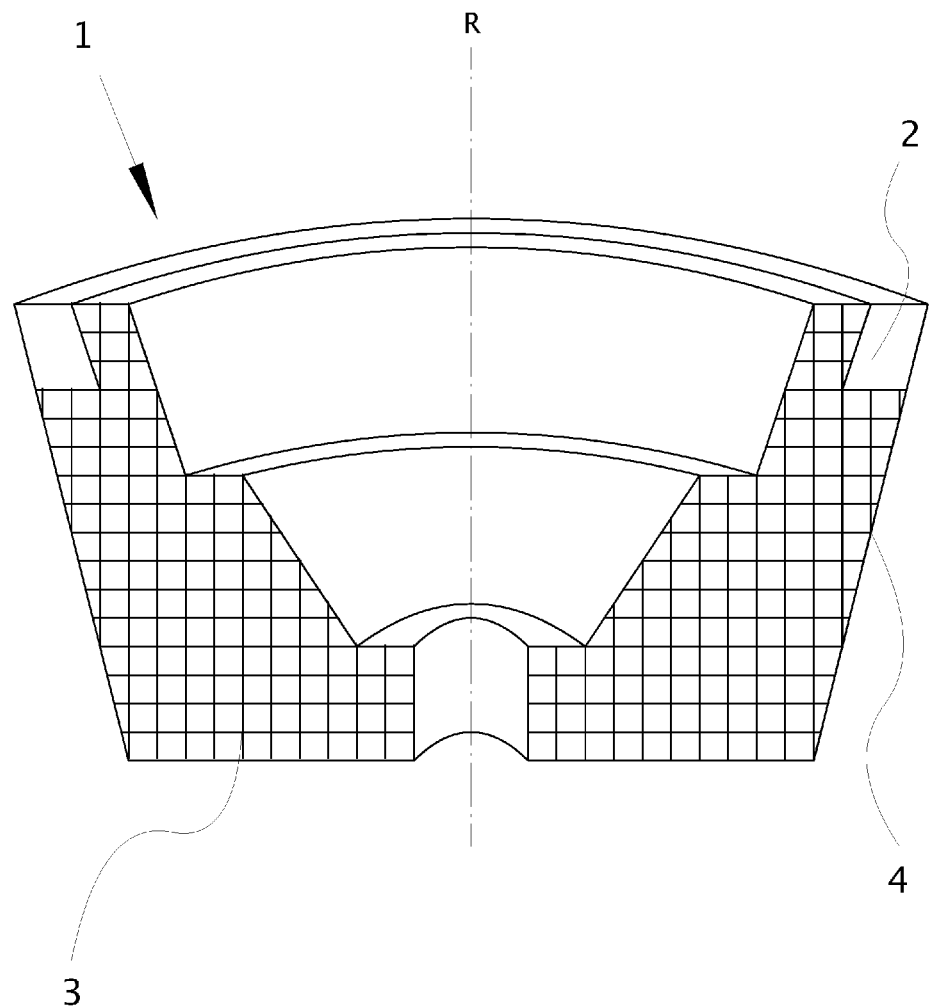
FIG. 1 is a schematic cross-sectional view of a machining tool according to a first embodiment of the present invention.

FIG. 1 illustrates a cross-section of an exemplary embodiment of a machining tool 1 according to the present invention. In this example, the machining tool 1 is a grinding tool that has a conical form with the base end face of the tool having a smaller diameter than the top end face. The top end face refers to the surface that will contact the material to be machined by the tool while the base end face is connected with the actuating mechanism of the tool, which is not shown in the drawings. The machining tool 1 has an outer shell 4 which defines the form, in this case a conical form.

In this exemplary embodiment shown in FIG. 1, there are three distinct layers of the tool along the direction of a rotation axis R. In the top most layer the thickness of the tool is essentially constant, while the thickness in the middle layer increases and the thickness in the bottom layer decreases in the direction towards the base end face. The thickness of the machining tool 1 may thus vary or stay constant along the direction of a rotation axis R. Additionally, while three distinct layers setting three circularly ringed surfaces are shown, the present invention is not limited in this manner and may include more or fewer layers and surfaces.

In order to provide a durable top end surface to machine the material subject to the machining tool 1, the outer circumference of the top end surface is coated with an abrasive coating or component 2. An example of an ideal coating material is diamond, and more particularly diamond particles. Diamond is known for its superior physical properties, namely properties of hardness and thermal conductivity and used extensively in the field of machining tools 1. The diamond grit may range from 80 to 1200 grit depending on the application.

As seen in FIG. 1, the shape of the present machining tool 1 is rotationally symmetrical about the rotation axis R. It is an important aspect of the machining tool 1 to be rotationally symmetrical for balancing the machining tool 1 during operation and to provide uniform pressure across the top end surface of the tool. In operation the machining tool 1 achieves a rotation rate typically between 1500 to 3500 rpm. A balanced tool leads to more stable operation and thus fewer, and weaker, vibrations.

The machining tool 1 of the present invention is characterized by the internal space of the tool comprising an internal skeleton structure 3. The internal skeleton structure 3 is integral with the outer shell 4 of the tool. The term skeleton is used to emphasize that the structure functions to support the tool but yet not completely filled with material, i.e., there are spaces inside the internal space of the tool. As such, the internal skeleton structure 3 defines void volumes in the internal space and establishes a material M and void V volumes of the internal space. The material volume consists of the material of the skeleton structure 3, while the void volume consists of portions of the internal space which are not filled with the material of the skeleton structure 3. In the present example of FIG. 1, and in the majority of cases, the void volume is filled with air but can be any filler material that is of lower specific weight than the material of the skeleton structure 3. The internal space can therefore be considered to consist of a material to void ratio M/V that aids in characterizing the relative space or density of material inside the tool.

An important aspect of the present invention is that the material to void ratio M/V be distributed substantially identical along any given radius r centred about the rotation axis R and the corresponding symmetrical radius r'. This means that any opposing pair of radii (forming a diameter for the machining tool 1) will have the same M/V ratio. Even though for the purpose of explaining the present invention the term radius is used, it should be understood that this term also includes an area/volume defined by a plurality of radii rather than a single line defined by a radius. In this case, the same principle applies and opposing symmetrical areas/volumes will have the same material to void ratio M/V distribution for both sides. This follows that on the basis that each radius in an area/volume has an opposing corresponding radius with the same distributed ratio.

With substantially identical material to void ratios M/V distributed for each symmetrical radii, an optimal balance is found across the length of the tool. This balance is important to minimizing vibration and reducing the strength of the vibration of the machining tool 1 during operation. Moreover, due to the presence of void volumes throughout the internal space of the machining tool 1, the overall weight of the tool is decreased in comparison with tools which are solid throughout. This leads to further reduction in the strength and amount of vibrations. The void volumes are made possible due to the internal skeleton which provides sufficient support for the structure of the tool while allowing gaps of open space or lighter material. In practice, material to void ratios found to perform well ranged from between 0.7 to 0.4, and particularly set to below each of 0.7, 0.6, 0.5, 0.4, and 0.3, providing an optimal balance of durability, lightness and minimal vibration.

Furthermore, with respect to the material to void ratio M/V, the distribution of this ratio throughout the radius means that the ratio may have local deviations along the radius. Additionally, while the counterpart symmetrical radius contains a substantially identical distribution, the local ratio(s) for a portion along a radius do not have to be identical to the local ratio(s) on the corresponding opposite position of the symmetrical radius. The present invention also supports a machining tool 1 in which the local material to void ratio M/V deviates substantially from the overall material to void ratio M/V. The machining tool 1 will be effectively balanced so long as the distribution is substantially identical for symmetrical radii. Allowing these deviations provides manufacturing flexibility.

In this example of FIG. 1, the internal skeleton structure 3 is shown as a grid having straight walls. In the cross-section this grid is shown in two dimensions but one can appreciate it is a three dimensional grid throughout the entire internal space of the machining tool 1. However, the invention is not limited thereto and may comprise a range of different internal skeleton structures 3 in the internal space. For example, the internal skeleton structure 3 may take on the form of any of the following: a three dimensional grid having curved walls instead of straight walls, a three dimensional scaffold having straight beams or curved beams, a honeycomb structure, an irregular structure, a sponge structure and any combinations thereof.

The internal skeleton structure 3 may serve as a supporting frame structure. A supporting frame structure provides certain portions with greater supporting strength than other parts of the structure. The supporting frame structure is a typical embodiment of the aforementioned feature of local material to void ratio being substantially different from the overall material to void ratio, due to the emphasis of providing strong structural support in only certain areas of the internal skeleton. Similar to a drywall construction in which support beams provide the majority of the support over the wall surface, certain components of the skeleton may be designed to bear most of the weight in contrast to an even distribution of support across each element in the skeleton. A scaffold structure is also an example of this type of supporting frame structure.

Figure 2:
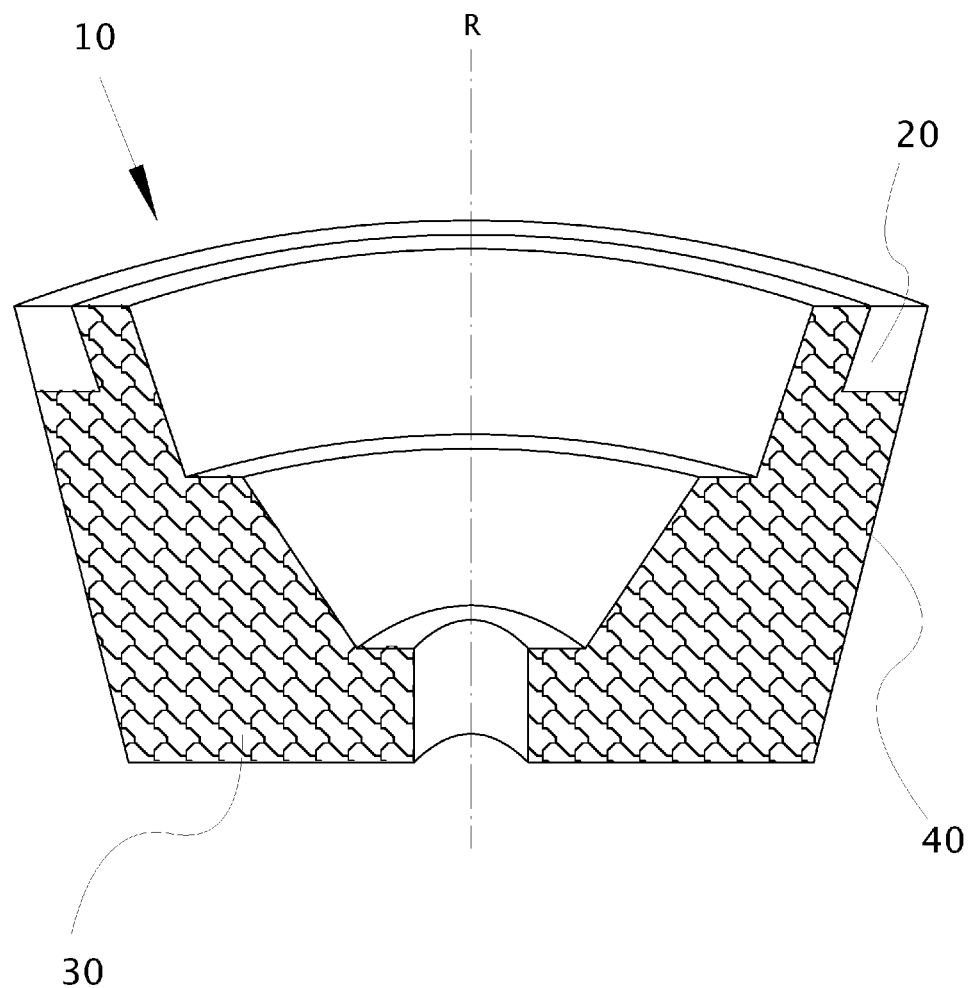
FIG. 2 is a schematic cross-sectional view of a machining tool according to a second embodiment of the present invention.

A second embodiment of the present invention illustrates an alternative skeleton structure 30. FIG. 2 depicts the second embodiment of the present invention. The components of this embodiment, machining tool 10, abrasive coating or component 20, and outer shell 40, are the same as those in the first embodiment, differing in only the internal skeleton structure 30. In this embodiment, instead of the grid structure in the first embodiment, the internal skeleton structure 30 is a sponge-like structure. While a regular pattern is shown, an irregular sponge structure is also possible. This sponge structure includes a plurality of void volumes that may be interconnected. The void volumes are in this figure depicted as the white space enclosed by walls of the material making up the internal skeleton. The density of material in each section may vary given an irregular structure, although the identical material to void ratio M/V distribution for symmetrical radii must still be met. In comparison with the grid structure of the embodiment depicted in FIG. 1, the structural properties and vibrational characteristics are different.

In the present invention, the internal skeleton structure 3, 30 may be made of the same material as the outer shell 4, 40. This facilitates ease of manufacturing and homogeneity throughout the entire tool. The material may be a metal, such as iron, steel, stainless steel, nickel, aluminium, wolfram, molybdenum, bronze, brass or the like. Such materials are advantageous over carbon due to the much lower cost of production and simplified and quicker production than carbon machining tools require. According to another aspect of the present invention, a method for manufacturing the machining tool as described above is provided.

Firstly, the machining tool is manufactured via a bottom-up process in which the tool is created layer-by-layer. A selected material is applied layer-by-layer to create essentially each successive horizontal cross-section of the machining tool.

Specifically, one exemplary manufacturing process comprises the acts of:
a) melting the material forming the outer shell and the internal skeleton structure 3, 30 by an applicator,
b) moving the applicator to a first end face of a spatially narrow deposit of the material,
c) applying small amounts of the molten material to the end face of a spatially narrow deposit of the identical material using the applicator,
d) moving the applicator to a second end fact of a spatially narrow deposit of the material, and
e) repeating acts c) and d).

The applicator is a component of the manufacturing system and is capable of heating and applying the material to be used for forming the tool. An example of an applicator is an extrusion nozzle, which heats material and then extrudes the heated material to form a portion of the tool. The material essentially hardens immediately after extrusion and bonded to the surface onto which it was deposited on.

Figure 3A:
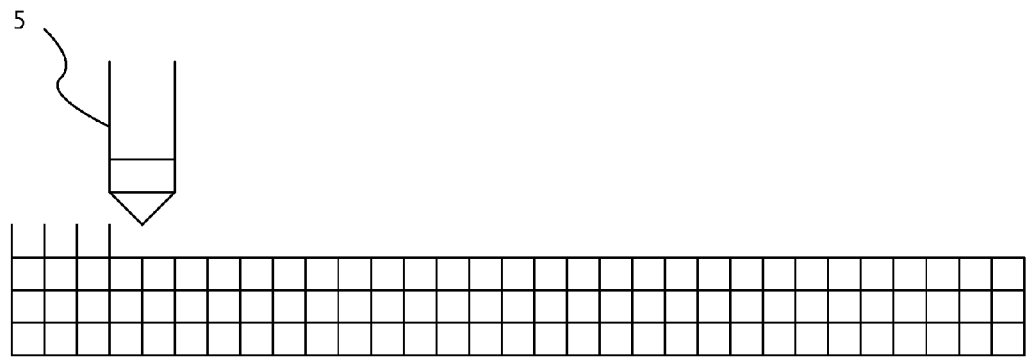
FIGS. 3a to 3c are schematic views of a process of the machining tool.
Figure 3B:
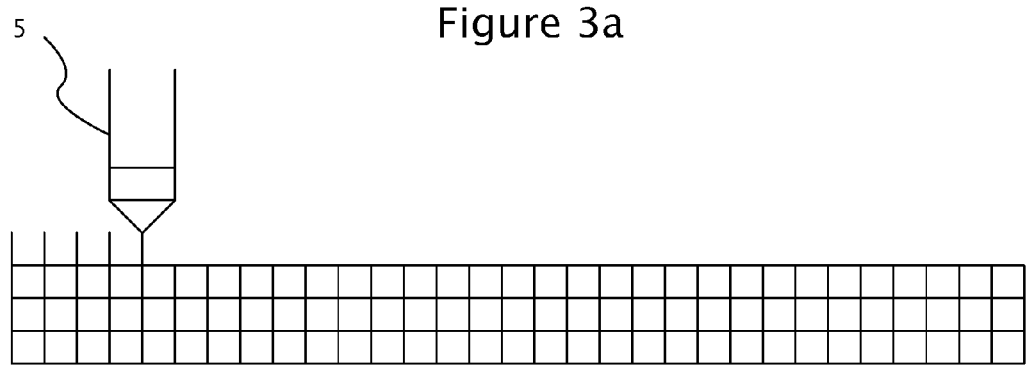
Figure 3C:
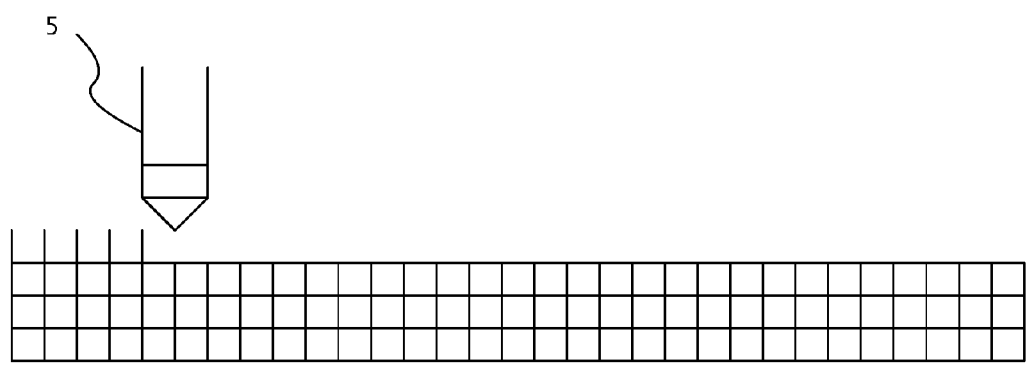

The above process is exemplified in FIGS. 3a to 3c. After the material is melted (act not shown in the figures), an applicator 5 is moved to an end face or surface of a particular narrow portion of the material that has formed part of the tool. This position is given in FIG. 3a. The applicator 5 then applies an amount of material necessary to form the desired narrow portion as shown in FIG. 3b. Thereafter, as illustrated in FIG. 3c, the applicator is moved to another position to continue such process. The applicator performs this process one layer at a time. In the example of FIGS. 3a to 3c, the vertical portions of the given layer are formed one by one. When the last vertical portion is formed, the applicator would continue onto the next layer.

Horizontal or curved portions may be formed in a similar manner. In particular, the next layer would be a layer of horizontal portions since the desired internal skeleton structure is a grid. While FIGS. 3a to 3c show a sequential processing of the method, the method is not limited thereto. The vertical portions may be formed in any desirable order.

The present invention also includes an alternative method for manufacturing the machining tool, this alternative comprising the acts of:
- a) applying a shapeless and uncured substrate to a first end face of a spatially narrow deposit of cured substrate,
- b) irradiating the shapeless and uncured substrate at a point in close proximity of the first end face using a spatially resolved light source to melt, sinter or cure the shapeless and uncured substrate to form a spatially narrow deposit of the substrate integral with the first end face,
- c) repeating acts (a) and (b).

The substrate is typically powder or liquid form of the material to be used to manufacture the tool. A light source that serves the purpose of melting, sintering or curing the material may be a laser or other collimated light source. The laser may be a carbon dioxide laser, a Ne:YAG laser, UV laser or the like.

In this alternative manufacturing process, instead of applying melted material from an applicator, a laser is used to melt, sinter or cure the substrate which is provided, amongst other areas, on a narrow portion of an end face of the tool. The substrate is initially in a shapeless uncured form and is made solid and integral with the end face after the melding operation performed by the laser. Similar to the applicator, the laser creates the tool one layer at a time, albeit in a different manner as discussed above.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A grinding tool for machining of materials, the grinding tool having a substantially rotationally symmetrical shape with respect to a rotation axis (R), the grinding tool comprising:
   an outer shell centered about the rotation axis (R) and defining an internal space therein and a shape of the grinding tool, the outer shell encasing an internal skeleton structure in the internal space, the outer shell and the internal skeleton structure being monolithically formed as a single unit, wherein at least a part of a surface of the outer shell is provided with an abrasive coating or component,
   the internal skeleton structure defining void volumes in the internal space thereby establishing material and void volumes (M, V) of the internal space, and wherein a material to void ratio M/V is distributed substantially identically along each radius (r) around the rotation axis (R) and a respective symmetrical radius (r') collinear with and oriented opposite to the radius (r).

2. The grinding tool of claim 1, wherein the internal skeleton structure is made of the same material as the outer shell.

3. The grinding tool of claim 1, wherein an overall material to void ratio $M/V_G$ of the internal skeleton structure is <0.7.

4. The grinding tool of claim 1, wherein the material to void ratio MN has local deviations.

5. The grinding tool of claim 4, wherein a local material to void ratio M/V deviates substantially from the overall material to void ratio $M/V_G$.

6. The grinding tool of claim 4, wherein the internal skeleton structure includes a supporting frame structure.

7. The grinding tool of claim 2, wherein the voids are filled by a filler material other than the material of the skeleton structure and the outer shell.

8. The grinding tool of claim 1, wherein the internal skeleton structure is selected from a group comprising: a three dimensional grid having straight walls, a three dimensional grid having curved walls, a three dimensional scaffold having straight beams, a three dimensional scaffold having curved beams, a honeycomb structure, an irregular structure, a sponge structure and combinations thereof.

9. The grinding tool of claim 1, wherein the diameter of the substantially rotationally symmetrical shape varies along a direction of the rotation axis (R).

10. The grinding tool of claim 2, wherein the material forming the outer shell and the internal skeleton structure is a metal.

11. The grinding tool of claim 1, wherein the abrasive coating or component includes diamond particles.

12. The grinding tool of claim 7, wherein the filler material is of lower specific weight than the material of the internal skeleton structure and the outer shell.

13. The grinding tool of claim 1, wherein the outer shell and the internal skeleton structure is formed in a layer-by-layer manufacturing process.

* * * * *